United States Patent Office 2,911,399
Patented Nov. 3, 1959

2,911,399

DIPHENYLZINC-TITANIUM TETRACHLORIDE POLYMERIZATION INITIATOR AND PROCESS

Willard C. Bull, Joplin, Mo., Joe H. Cain, Columbus, Kans., Roland J. Spomer, Clinton, Ind., Herman L. Finkbeiner, Jr., Pittsburg, Kans., and Robert W. Hill, Joplin, Mo., assignors to Spencer Chemical Company, a corporation of Missouri No Drawing. Application February 9, 1956
Serial No. 564,379

6 Claims. (Cl. 260—93.7)

This invention relates to new compositions of matter. More particularly, this invention is concerned with novel initiators or activators for polymerizing olefins such as ethylene and propylene. This invention is also concerned with novel processes of producing such initiators.

Ethylene has been polymerized heretofore at high temperatures and very high pressures with the aid of initiators of the "free radical" type. The polyethylenes resulting from high pressure processes have been suitable for some applications but not for others. This is because it has been particularly difficult to increase the rigidity and softening points of high pressure polyethylenes to levels necessary for the desired applications. There has been some success in producing polyethylenes with the desired properties by employing higher pressures. These processes, however, utilize pressures considered above practical limits for convenient and economical commercial production. Somewhat better results have been attained by utilizing lower temperatures. However, the free radical initiators are not effective in inducing polymerization below rather high minimum reaction temperatures, below which it is desirable to effect polymerization.

Initiators of the "ionic" type have been found to be somewhat successful for the polymerization of ethylene and propylene at lower temperatures and pressures. Among these may be mentioned such initiators as the alkali metal hydrides, Grignard reagents, triethyl aluminum and the activated supported transitional elements. However, the products of these processes most often range from oils to low melting waxes. In those instances where a satisfactorily high molecular weight polymer is obtained, the process is accompanied by pressures in excess of 1000 p.s.i.g., temperatures above 100° C., or reaction times in excess of fifteen hours.

By means of the present invention an initiator is provided which will polymerize polyethylene to high molecular weights at atmospheric pressures and room temperatures and is flexible as to pressure and temperature in that it will proceed satisfactorily at high or very low temperatures and at high or low pressures.

According to the present invention, it has been found that the combination of diphenylzinc and titanium tetrachloride gives a new composition of matter which is an initiator of high activity for the polymerization of ethylene and propylene. This is particularly surprising since neither diphenylzinc nor titanium tetrachloride are effective as polymerization initiators for olefins such as ethylene and propylene.

The initiator of this invention polymerizes ethylene and propylene at surprisingly low temperatures and pressures to give products of high molecular weights and high softening points. It is, therefore, possible to form polyethylene and polypropylene resins without resorting to the higher temperatures and pressures formerly used. A more suitable and convenient process employing mild conditions is accordingly also provided by this invention.

The initiator formed by contacting and reacting diphenylzinc and titanium tetrachloride is a novel composition that appears to be a complex of presently undetermined composition which is insoluble in most reaction media. Such complexes solvate with many media; however, the complex, as well as solvated forms thereof, are useful initiators.

The initiators are conveniently prepared by intimately mixing a diphenylzinc and titanium tetrachloride in a liquid medium. Diphenylzinc is very reactive but may be handled conveniently out of contact with air and water. It is preferred to employ as the medium an inert organic solvent such as a saturated aliphatic or alicyclic hydrocarbon, an aromatic hydrocarbon or halogenated derivatives of such hydrocarbons. Preferred organic media are pentane, hexane, cyclohexane, isooctane, petroleum ether, benzene, toluene, monochlorobenzene and the like, and mixtures thereof.

To prepare the initiators, a ratio of about one molar equivalent of diphenylzinc to about 0.25 to 4.00 molar equivalents of titanium tetrachloride is used. To prepare the preferred initiator, a ratio of about one mole of diphenylzinc to about one mole of titanium tetrachloride is combined.

The order in which the reactants are added to the medium is generally not critical. However, in certain situations it appears that solvation occurs between the medium and one of the reactants which lowers its reactivity. Therefore, the order of addition of the reactants should be adjusted appropriately. Thus, when toluene is the medium diphenylzinc is preferably added first and then titanium tetrachloride to produce the initiator.

After diphenylzinc and titanium tetrachloride have been united, reaction takes place at room temperature although lower and higher temperatures may be used.

The initiator provided by this invention is particularly useful in the polymerization of ethylene and propylene since they induce polymerization, surprisingly, at relatively low temperatures and pressures and give products of high molecular weight and high softening points. For best results, it is preferred to use the initiator soon after preparation, viz., within an hour after preparation.

As previously indicated above, polymerization of ethylene and propylene is effected with the initiator at low temperatures and pressures. The polymerization may be conveniently effected with the initiator at temperatures as low as that of liquid nitrogen and as high as the decomposition temperature of the initiator which is about 300–500° C. However, excellent results may be attained with convenience at about 0° C. to about 100° C. and preferably at 20° C. to 60° C. The higher temperatures apparently increase the rate of polymerization although the polymers so produced may be of relatively lower molecular weight than those obtained at lower temperatures.

Polymerization with the described initiator is achieved in this process over a wide pressure range from subatomspheric pressures to pressures of about 1000 p.s.i.g. and higher, such as pressures of 2000 atmospheres. However, lower pressures from about atmospheric to about 200 p.s.i.g. give generally preferred results and are most economically used. In general, the polymerization rate is increased by the higher pressures. However, the activity of the initiator is such that there is not much reason in operating at the higher pressures.

To effect the polymerization, the ethylene and/or propylene are contacted with the initiator, preferably under liquid reaction conditions although vapor phase operations are within the scope contemplated by this invention. Inert organic solvents such as saturated aliphatic or alicyclic hydrocarbons, aromatic hydrocarbons or halogenated derivatives of such hydrocarbons may be used as the reaction medium. Preferred organic media are pentane, hexane, cyclohexane, isooctane, petroleum ether, benzene, toluene, monochlorobenzene and the like and mixtures thereof. In addition, by proper selection of temperatures and pressures liquid ethylene and/or propylene also may be used as the medium.

The amounts of initiator used to effect polymerization of ethylene and propylene are not critical; all that is required is that an effective amount be used. The rate of polymerization as well as the molecular weight of the polymers can be varied by changing the ratio of initiator to ethylene and propylene. Some loss of activity of the initiator may be expected due to the presence of impurities that may be present in the reaction. It is, therefore, desirable to employ more than what may be considered to be trace amounts of the initiator.

The relationship of initiator to reaction medium is subject to wide variation. The larger amounts of initiator give a more rapid polymerization than do lesser, minimum amounts. However, as little as .002 mole of initiator per 100 ml. of medium effect polymerization.

By the use of the described initiator, it has been found that highly pure ethylene and propylene need not be used to achieve satisfactory polymerization. Ethylene and propylene of 95% purity containing lower alkanes, nitrogen, hydrogen and other inert materials are entirely satisfactory at the low temperature-low pressure conditions which may be used with the initiator. This is opposite to conventional high pressure processes wherein high purity ethylene must be employed. The system should be maintained substantially free of water and oxygen, however, since these substances appear to affect the initiator adversely.

The rate of reaction is, of course, dependent on the other process conditions as already stated. The initiator is of such exceptional activity, however, that at 50° C. and 50 p.s.i.g. good yields of polyethylene and polypropylene result in a matter of minutes.

By carefully controlling the operating conditions, polymers may be produced having a wide range of molecular weights. Under the preferred conditions, viz., low temperature and low pressure, the polymerization using the initiator of this invention gives products averaging about 30,000 molecular weight or greater. Products much higher, such as 100,000, are also produced. Such polymers have softening points generally in excess of 120° C. (Vicat) and are substantially more rigid than polymers produced by conventional commercial high pressure processes. The polymers are free of zinc and contain only occasional insignificant traces of titanium.

The following example is added to illustrate working embodiments of the invention, it being understood that the invention is not to be thereby limited to this example.

*Example*

Diphenylmercury (0.1 mole) and zinc dust (0.15 mole) are placed in a flask with 200 ml. of decalin and the mixture refluxed six days to form diphenylzinc. At the end of this time the mixture is filtered and the brown filtrate allowed to cool further. The material left on the filter is largely amalgamated zinc. On cooling, a cream colored solid slowly precipitated. When this solid settles, the clear brown supernatant liquid is decanted. It contains a maximum of .005 mole of diphenylzinc in 10 ml. of solution.

20 ml. of the solution is then added to 300 ml. of hexane containing 1.00 ml. (.009 mole) of titanium tetrachloride. A copious brown precipitate appears immediately.

The diphenylzinc-titanium tetrachloride initiator prepared as above is then placed, as a slurry, in a Parr autoclave at 25° C. and ethylene added at 50 p.s.i.g. to the agitated mixture. The temperature need not be controlled and may rise to 60–70° C. After the uptake of ethylene is completed as shown by a steady pressure, the autoclave is opened and the mixture filtered to recover polyethylene. It has a softening point of 129° C. and a molecular weight (Vicat) of 81,000.

Various changes and modifications of the invention can be made and to the extent that such variations incorporate the spirit of this invention, they are intended to be included within the scope of the appended claims.

What is claimed is:
1. A polymerization initiator formed by reacting a ratio of about one mole of diphenylzinc to about 0.25 to 4 moles of titanium tetrachloride in an inert medium.
2. A polymerization initiator formed by reacting a ratio of about one mole of diphenylzinc to about 0.25 to 4 moles of titanium tetrachloride in the presence of an inert organic solvent.
3. The process which comprises reacting a ratio of about 1 mole of diphenylzinc to 0.25 to 4 moles of titanium tetrachloride in the presence of an inert organic solvent to produce a reaction product.
4. The process which comprises contacting a 1-olefin of less than 4 carbons with a polymerization initiator consisting essentially of the reaction product of a ratio of about one mole of diphenylzinc to 0.25 to 4 moles of titanium tetrachloride in the presence of an inert medium at a temperature from 0° C. to 300° C. and a pressure from atmospheric to 2000 atmospheres to produce a polymer of the 1-olefin.
5. The process that comprises contacting a 1-olefin of less than 4 carbons with a polymerization initiator consisting essentially of the reaction product of a ratio of about one mole of diphenylzinc to 0.25 to 4 moles of titanium tetrachloride in the presence of an inert organic solvent at a temperature from 0° C. to 100° C. and a pressure from atmospheric to 1000 p.s.i.g. to produce a polymer of the 1-olefin.
6. The process that comprises contacting a 1-olefin of less than 4 carbons with polymerization initiator consisting essentially of the reaction product of a ratio of about one mole of diphenylzinc to 0.25 to 4 moles of titanium tetrachloride in the presence of an inert organic solvent at a temperature from 0° C. to 100° C. and a pressure from atmospheric to 200 p.s.i.g. to produce a polymer of the 1-olefin.

References Cited in the file of this patent

UNITED STATES PATENTS

| 2,475,520 | Roedel | July 5, 1949 |
| 2,721,189 | Anderson et al. | Oct. 18, 1955 |
| 2,762,791 | Pease et al. | Sept. 11, 1956 |
| 2,816,883 | Larcher et al. | Dec. 17, 1957 |

FOREIGN PATENTS

| 534,792 | Belgium | Jan. 31, 1955 |
| 533,362 | Belgium | May 16, 1955 |

OTHER REFERENCES

Gilman et al.: J. Organic Chem., 10, 505–515 (November 1945).